United States Patent

Matsumoto et al.

[11] Patent Number: 6,092,434
[45] Date of Patent: Jul. 25, 2000

[54] BALL SCREW DEVICE OF BALL-CIRCULATING-PART EMBEDDED TYPE

[75] Inventors: Tetsuo Matsumoto, Gunma; Shigeharu Kobayashi, Nagano; Kazuo Miyaguchi, Gunma, all of Japan

[73] Assignee: NSK Ltd., Tokyo, Japan

[21] Appl. No.: 08/964,468

[22] Filed: Nov. 4, 1997

[30] Foreign Application Priority Data

Nov. 7, 1996 [JP] Japan ................................ 8-309880

[51] Int. Cl.$^7$ .................................................. F16H 25/22
[52] U.S. Cl. ..................... 74/459; 74/424.8 R; 74/89.15; 403/343
[58] Field of Search ............................... 74/459, 424.8 R, 74/89.15; 403/342, 343, 315, 316

[56] References Cited

U.S. PATENT DOCUMENTS

| 2,339,615 | 1/1944 | Castelli | 403/342 |
|---|---|---|---|
| 3,532,004 | 10/1970 | Nilsson | 74/459 |
| 3,592,072 | 7/1971 | Nilsson | 74/459 |
| 4,846,011 | 7/1989 | Gaffney | 74/424.8 R |
| 5,303,607 | 4/1994 | Katahira | 74/459 |
| 5,711,188 | 1/1998 | Miyaguchi et al. | 74/459 |

FOREIGN PATENT DOCUMENTS 2134349  11/1990  Japan .
7190161  7/1995  Japan .

Primary Examiner—Mary Ann Battista
Assistant Examiner—David Fenstermacher
Attorney, Agent, or Firm—Sughrue, Mion, Zinn, Macpeak & Seas, PLLC

[57] ABSTRACT

A ball screw device of a ball-circulating-part embedded type includes: a screw shaft having a helical thread groove on an outer peripheral surface thereof; a ball nut having a thread groove provided on an inner peripheral surface thereof in correspondence with the thread groove of the screw shaft, the screw shaft being loosely fitted in the inner peripheral surface of the ball nut; and a multiplicity of balls rotatably fitted between the two thread grooves and adapted to circulate while being guided by a ball-circulating part fitted in the ball nut wherein the ball nut has a retaining recess on an outer peripheral surface thereof, wherein at least a portion of a fitted outward surface of the ball-circulating part is substantially flush with the outer peripheral surface of the ball nut in a vicinity of the fitted outward surface of the ball-circulating part, and wherein there is provided a circulating-part holding member for fixing the ball-circulating part to the ball nut by being fitted over the outer peripheral surface of the ball nut and covering the fitted outward surface of the ball-circulating part, the circulating-part holding member having a projection for engaging the retaining recess of the ball nut.

10 Claims, 10 Drawing Sheets

BALL SCREW DEVICE OF BALL-CIRCULATING-PART EMBEDDED TYPE

BACKGROUND OF THE INVENTION

The present invention relates to a ball screw device, and more particularly to improvements of a structure for fixing a ball-circulating part embedded in a ball nut.

As types of circulating balls in a ball screw device, the following two types are conventionally known. Namely, one type is arranged such that, as shown in FIGS. 1 and 2, by using a ball-circulating tube 4 disposed in a ball nut 2 threadedly engaged with a screw shaft 1 via a multiplicity of balls 3, the balls are circulated by being introduced into the ball-circulating tube 4 from ball screw grooves of the screw shaft 1 and the ball nut 2. Another type is arranged such that, as shown in FIG. 3, by using a ball-circulating piece 5 disposed inside the ball nut 2, balls 3 are introduced into a groove formed in the ball-circulating piece 5 and are circulated by riding over a ridge between adjacent ball groove portions of the screw shaft 1.

In these circulating-type ball screw devices, an adhesive is used to fix the ball-circulating tube or the ball-circulating piece. The adhesive is filled in a space 6 which is formed after the ball-circulating tube or the ball-circulating piece is fitted in the ball nut. In addition, as the adhesive, a material is used whose mechanical properties, such as coefficients of thermal expansion and elastic displacement, are very similar to those of the ball nut member, and which undergoes a very small change in volume when it is hardened is used.

However, with the above-described conventional ball screw devices, the process for sufficiently cleaning and degreasing the surfaces of the ball nut 2 and the ball-circulating tube 4 or the ball-circulating piece 5, which serve as surfaces to be bonded, becomes necessary in order to maintain the bonding strength of the adhesive. In addition, the time required until the adhesive becomes hardened and stable after assembly is long. Further, after the adhesive has become hardened, the operation of removing a portion which has risen from the outer peripheral surface of the ball nut is required. Thus, there is a problem in that the assembly of the ball screw device is very time-consuming and troublesome.

SUMMARY OF THE INVENTION

In view of the above-described circumstances, it is an object of the present invention to provide a high-productivity ball screw device which does not use an adhesive in the attachment of the ball-circulating tube or the ball-circulating piece and therefore makes it possible to eliminate the troublesome process of cleaning and degreasing, and which involves minimum machining and less time and trouble in the assembly with a simple structure.

To this end, in accordance with a first aspect of the present invention, there is provided a ball screw device of a ball-circulating-part embedded type, comprising:

a screw shaft having a helical thread groove on an outer peripheral surface thereof;

a ball nut having a thread groove provided on an inner peripheral surface thereof in correspondence with the thread groove of the screw shaft, the screw shaft being loosely fitted in the inner peripheral surface of the ball nut; and a multiplicity of balls rotatably fitted between the two thread grooves and adapted to circulate while being guided by a ball-circulating part fitted in the ball nut wherein the ball nut has a retaining recess on an outer peripheral surface thereof, wherein at least a portion of a fitted outward surface of the ball-circulating part is substantially flush with the outer peripheral surface of the ball nut in a vicinity of the fitted outward surface of the ball-circulating part, and wherein there is provided a circulating-part holding member for fixing the ball-circulating part to the ball nut by being fitted over the outer peripheral surface of the ball nut and covering the fitted outward surface of the ball-circulating part, the circulating-part holding member having a projection for engaging the retaining recess of the ball nut.

In accordance with a second aspect of the present invention, there is provided a ball screw device of a ball-circulating-part embedded type, comprising:

a screw shaft having a helical thread groove on an outer peripheral surface thereof;

a ball nut having a thread groove provided on an inner peripheral surface thereof in correspondence with the thread groove of the screw shaft, the screw shaft being loosely fitted in the inner peripheral surface of the ball nut; and a multiplicity of balls rotatably fitted between the two thread grooves and adapted to circulate while being guided by a ball-circulating part fitted in the ball nut, wherein the ball nut has a retaining projection on an outer peripheral surface thereof, wherein at least a portion of a fitted outward surface of the ball-circulating part is substantially flush with the outer peripheral surface of the ball nut in a vicinity of the fitted outward surface of the ball-circulating part, and wherein there is provided a circulating-part holding member for fixing the ball-circulating part to the ball nut by being fitted over the outer peripheral surface of the ball nut and covering the fitted outward surface of the ball-circulating part, the circulating-part holding member having a projection for engaging the retaining projection of the ball nut.

In accordance with a third aspect of the present invention, there is provided a ball screw device of a ball-circulating-part embedded type, comprising:

a screw shaft having a helical thread groove on an outer peripheral surface thereof;

a ball nut having a thread groove provided on an inner peripheral surface thereof in correspondence with the thread groove of the screw shaft, the screw shaft being loosely fitted in the inner peripheral surface of the ball nut; and a multiplicity of balls rotatably fitted between the two thread grooves and adapted to circulate while being guided by a ball-circulating part fitted in the ball nut, wherein the ball nut has two retaining recesses on an outer peripheral surface thereof, wherein at least a portion of a fitted outward surface of the ball-circulating part is substantially flush with the outer peripheral surface of the ball nut in a vicinity of the fitted outward surface of the ball-circulating part, and wherein there is provided a circulating-part holding member for fixing the ball-circulating part to the ball nut by being fitted over the outer peripheral surface of the ball nut and covering the fitted outward surface of the ball-circulating part, and the circulating-part holding member engages an end portion of each of the two retaining recesses of the ball nut.

In accordance with a fourth aspect of the present invention, there is provided a ball screw device of a ball-circulating-part embedded type, comprising:

a screw shaft having a helical thread groove on an outer peripheral surface thereof;

a ball nut having a thread groove provided on an inner peripheral surface thereof in correspondence with the thread groove of the screw shaft, the screw shaft being loosely fitted in the inner peripheral surface of the ball nut; and a multiplicity of balls rotatably fitted between the two thread grooves and adapted to circulate while being guided by a ball-circulating part fitted in the ball nut wherein at least a portion of a fitted outward surface of the ball-circulating part is substantially flush with the outer peripheral surface of the ball nut in a vicinity of the fitted outward surface of the ball-circulating part, and wherein there is provided a circulating-part holding member for fixing the ball-circulating part to the ball nut by being fitted over the outer peripheral surface of the ball nut and covering the fitted outward surface of the ball-circulating part, and there is provided a restricting member for restricting the movement of the circulating-part holding member in an axial direction of the ball nut, the restricting member being press fitted to the outer peripheral surface of the ball nut.

In accordance with a fifth aspect of the present invention, there is provided a ball screw device of a ball-circulating-part embedded type, comprising:

a screw shaft having a helical thread groove on an outer peripheral surface thereof;

a ball nut having an engaging portion on an outer peripheral surface thereof and a thread groove provided on an inner peripheral surface thereof in correspondence with the helical thread groove of the screw shaft, the screw shaft being loosely fitted in the inner peripheral surface of the ball nut;

a multiplicity of balls rotatably fitted between the two thread grooves;

a ball-circulating member fitted in the ball nut for defining an endless rolling passage in which the balls are circulated while the balls are being guided by the ball-circulating part, at least a portion of a fitted outward surface of the ball-circulating member being substantially flush with the outer peripheral surface of the ball nut in a vicinity of the fitted outward surface of the ball-circulating member; and a holding member for fixing the ball-circulating member to the ball nut by being fitted over the outer peripheral surface of the ball nut and covering the fitted outward surface of the ball-circulating part, the holding member having an engaged portion which is engaged with the engaging portion of the ball nut so as to prevent the holding member from being moved relative to the ball nut in the axial direction thereof.

In the above-mentioned construction of the fifth aspect according to the present invention, it is preferable that the engaging portion of the ball nut comprises a retaining recess formed on the outer peripheral surface thereof; and the engaged portion of the holding member comprises a projection member formed on the inner peripheral surface thereof and engaged with the retaining recess.

In the above-mentioned construction of the fifth aspect according to the present invention, it is preferable that the retaining recess is extended over the whole of the outer peripheral surface thereof; and the projection member comprises a plurality of projections disposed at a predetermined interval in the circumferential direction of the holding member.

In the above-mentioned construction of the fifth aspect according to the present invention, it is preferable that the ball nut has two tube-fitting holes, and the ball-circulating member is a tube the end portions of which are respectively inserted into the two tube-fitting holes.

In the above-mentioned construction of the fifth aspect according to the present invention, it is preferable that the ball nut has a retaining hole, and the ball-circulating member is a ball circulating piece fitting into the retaining hole.

In the above-mentioned construction of the fifth aspect according to the present invention, it is preferable that the holding member is formed into a substantially C-shape in a cross section by forming a slit which extends over the entire length of the holding member in the axial direction.

In the above-mentioned construction of the fifth aspect according to the present invention, it is preferable that an attachment reference portion having an outer diameter larger than the outer diameter of the circulating-part holding member is formed around on the outer periphery of the ball nut.

In the above-mentioned construction of the fifth aspect according to the present invention, it is preferable that the engaging portion of the ball nut comprises a retaining recess formed on the outer peripheral surface thereof; and the engaged portion of the holding member comprises a projection member formed by cutting and bending an end portion in the axial direction of the holding member.

In the above-mentioned construction of the fifth aspect according to the present invention, it is preferable that the engaging portion of the ball nut comprises a protrusion formed on the outer peripheral surface thereof; and the engaged portion of the holding member comprises a projecting portion which is formed by cutting out a portion of the holding member.

In the above-mentioned construction of the fifth aspect according to the present invention, it is preferable that the engaging portion of the ball nut comprises two retaining recesses extended in the axial direction and formed on an outer peripheral surface thereof, and end portions of the engaged portion of the holding member are respectively brought in engagement with the two retaining recesses of the ball nut.

In the above-mentioned construction of the fifth aspect according to the present invention, it is preferable to further comprises:

a washer press-fitted to the outer peripheral surface of the ball nut for preventing the holding member from coming off in the axial direction.

In accordance with the present invention, an advantage can be obtained in that it is possible to provide a high-productivity ball screw device in which the ball-circulating part can be simply fixed reliably to the ball nut by means of the circulating-part holding member fabricated by press forming or plastic molding.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a description will be given of the embodiments of the present invention.

Figure 1:
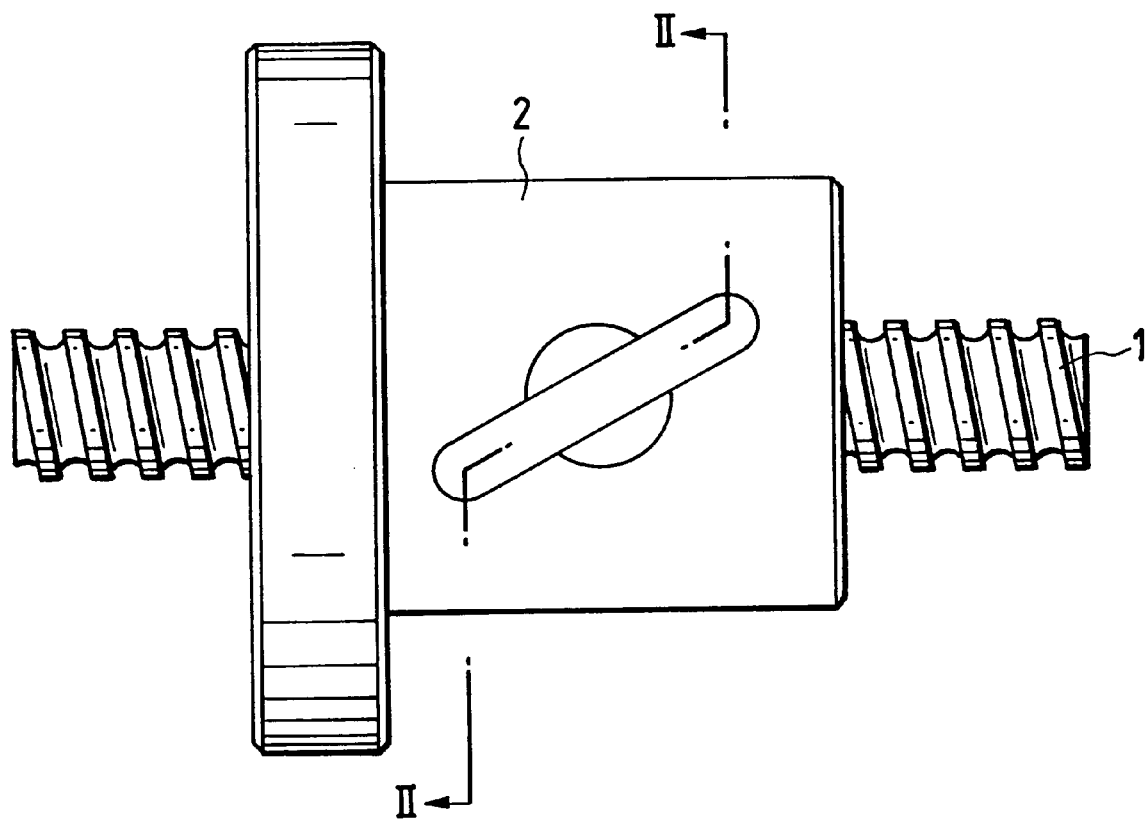
FIG. 1 is a plan view of a conventional ball screw device of the ball-circulating-part embedded type using a ball-circulating tube.
Figure 2:
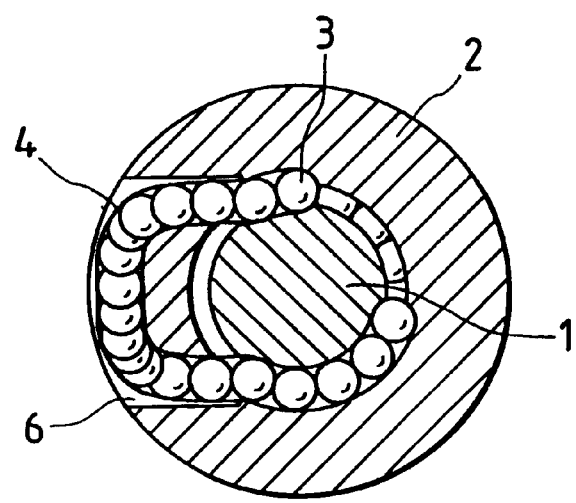
FIG. 2 is a cross-sectional view taken along line II—II of FIG. 1.
Figure 3:
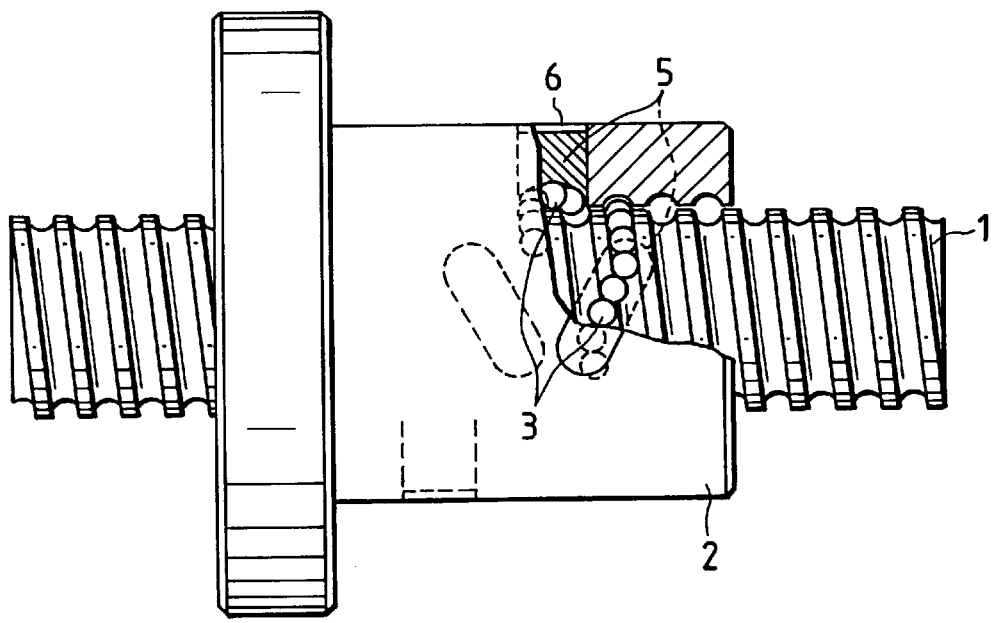
FIG. 3 is a plan view of a conventional ball screw device of the ball-circulating-part embedded type using a ball-circulating piece.
Figure 4:
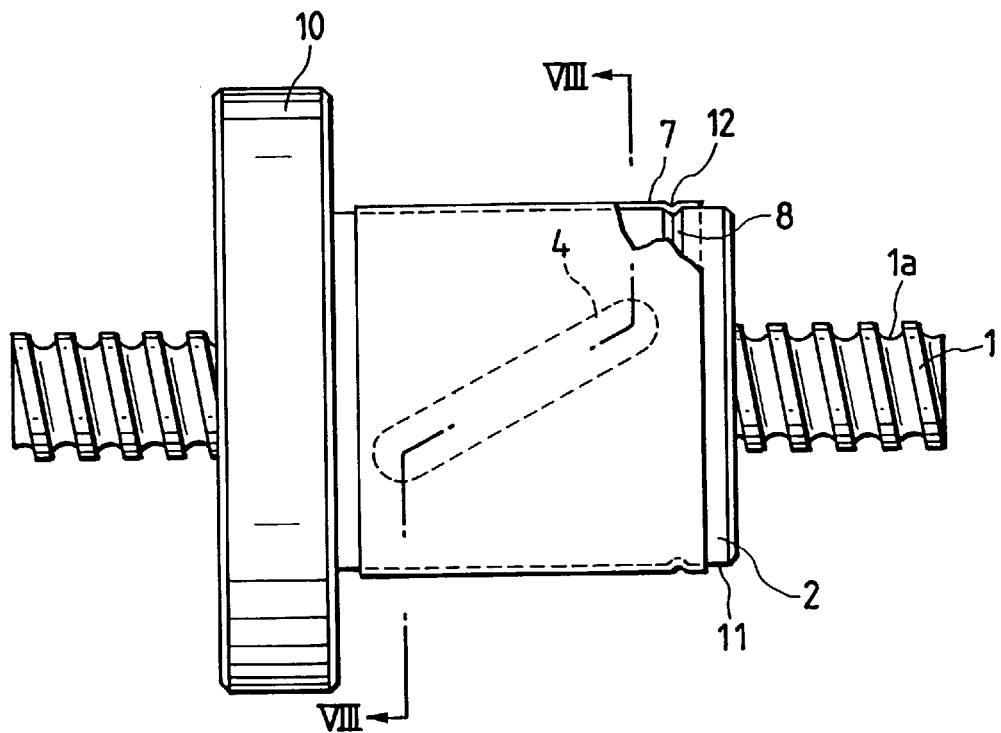
FIG. 4 is a plan view of a ball screw device of a ball-circulating-part embedded type in accordance with a first embodiment of the present invention.
Figure 5:
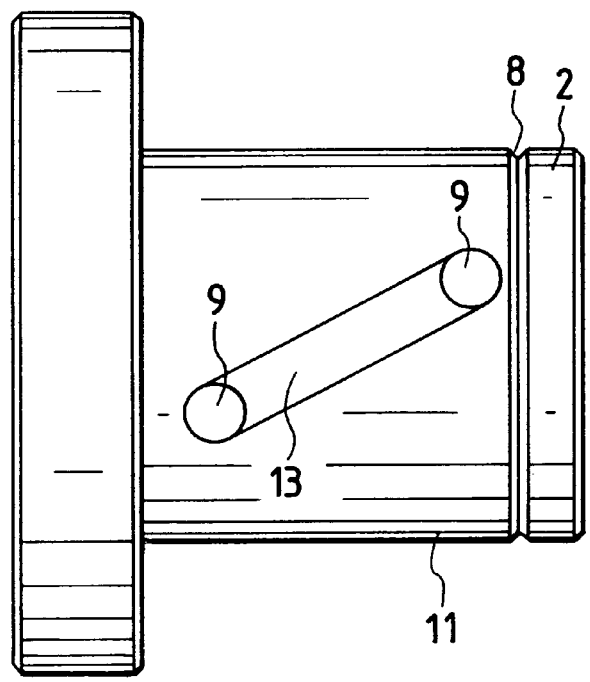
FIG. 5 is a plan view of a ball nut with a ball-circulating tube in FIG. 4 removed.
Figure 6:
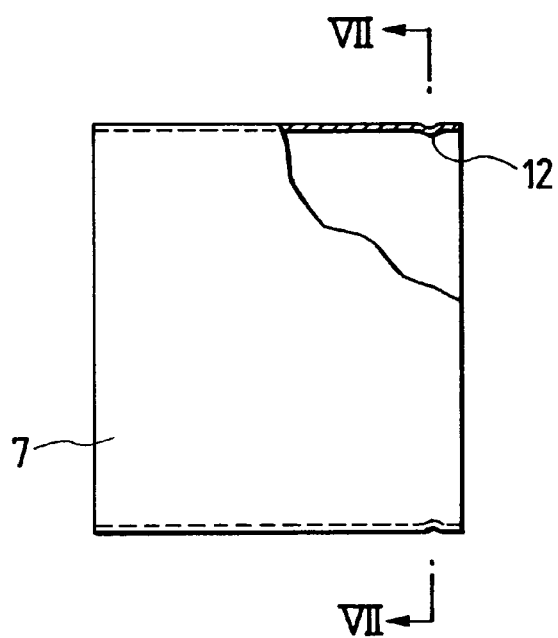
FIG. 6 is a front elevational view of a circulating-part holding member shown in FIG. 4.
Figure 7:
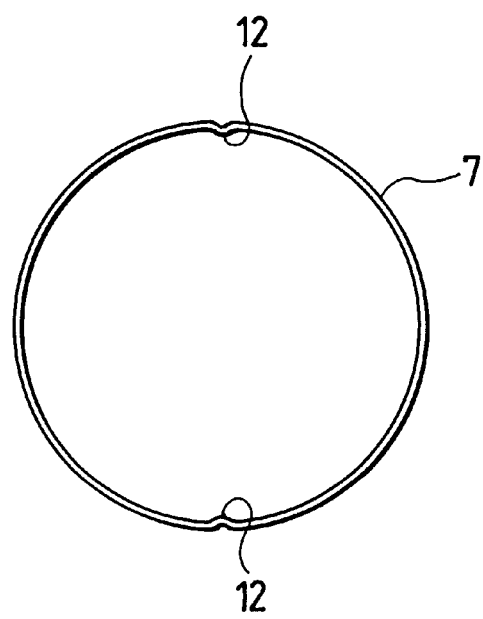
FIG. 7 is a cross-sectional view, taken along line VII—VII of FIG. 6, of the circulating-part holding member.
Figure 8:
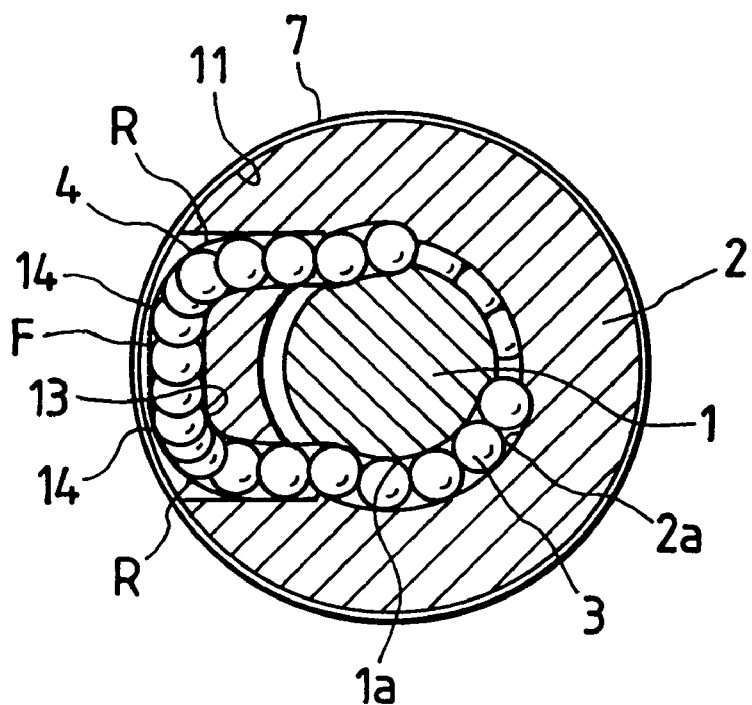
FIG. 8 is a cross-sectional view illustrating a ball-circulating tube section and taken along line VIII—VIII of FIG. 4.

FIGS. 4 to 8 show a first embodiment. FIG. 4 is a plan view. FIG. 5 is a plan view of a ball nut with a ball-circulating tube removed. FIG. 6 is a front elevational view of a circulating-part holding member. FIG. 7 is a cross-sectional view taken along line VII—VII of FIG. 6. FIG. 8 is a cross-sectional view illustrating a ball-circulating tube section and taken along line VIII—VIII of FIG. 4. In the drawings, those portions which are identical or similar to those of the conventional examples are denoted by the same reference numerals.

A screw shaft 1, which has on its outer peripheral surface a ball screw groove 1a having an arcuate or Gothic arch-shaped cross section, is threadedly engaged with a ball nut 2, which has on its inner peripheral surface a ball screw groove 2a having an arcuate or Gothic arch-shaped cross section and opposing the ball screw groove 1a of the screw shaft 1, via a multiplicity of balls 3 fitted in such a manner as to be capable of rolling between the two ball screw grooves 1a and 2a.

The ball nut 2 has a substantially hollow cylindrical shape, and an attaching flange 10 is formed around an outer peripheral portion at one end of the ball nut 2, while an annular groove 8 with a V-shaped cross section is formed in the vicinity of an outer peripheral portion of the other end of the ball nut 2 by lathe turning. A pair of tube-fitting holes 9 are formed in a central portion of the outer periphery of the ball nut 2. Fitted into the pair of tube-fitting holes 9 are both ends of a ball-circulating tube 4 having a substantially U-shaped configuration and a circular cross section and adapted to circulatingly guide the multiplicity of balls 3 rotatably fitted between the two ball screw grooves 1a and 2a. The tube-fitting holes 9 penetrate through the ball nut 2 and communicate with the ball screw groove 2a on the inner peripheral surface of the ball nut 2. A ball-circulating-tube abutment groove 13, which connects the two tube-fitting holes 9 and is inclined with respect to the axial direction of the ball nut 2, is formed on the outer peripheral surface 11 of the ball nut 2 by end milling. The ball-circulating-tube abutment groove 13 has a width which is substantially equal to the outer diameter of the ball-circulating tube 4 and such a depth that, when the ball-circulating tube 4 is fitted, two contact portions 14, each connecting a fitted outward surface linear portion F of the intermediate portion of the substantially U-shaped ball-circulating tube 4 and each curved bent portion R of the same, are substantially flush with an outer peripheral surface 11 of the ball nut 2, and the fitted outward surface except for the two contact portions 14 are located inwardly of the outer peripheral surface 11 of the ball nut 2 in the radial direction, as shown in FIG. 8.

As shown in FIGS. 6 and 7, a circulating-part holding member 7 has a hollow cylindrical shape having an inside diameter for fitting with the outer peripheral surface 11 of the ball nut 2 without a clearance. Projections 12 for engaging with the annular groove 8 having the V-shaped cross section at the outer peripheral portion of the ball nut 2 are formed in the vicinity of one end portion of the ball nut 2 on the inner peripheral side thereof. The circulating-part holding member 7 is formed by press forming.

To assemble the circulating-part holding member 7 onto the ball nut 2, both end portions of the ball-circulating tube 4 are first fitted respectively in the tube-fitting holes 9 of the ball nut 2, and a lower end of the intermediate portion of the ball-circulating tube 4 is made to abut against the bottom surface of the ball-circulating-tube abutment groove 13. Then, the circulating-part holding member 7 is fitted from the side where the groove 8 of the ball nut 2 is present, and the projections 12 are engaged in the groove 8, thereby fixing the circulating-part holding member 7 in the axial direction of the ball nut 2. At this time, the circulating-part holding member 7 is fitted to the outer peripheral surface 11 of the ball nut 2 without a clearance, and abuts against the two connecting contact portions 14, each connecting the outward surface portion of each curved bent portion of the ball-circulating tube 4 and the fitted outward surface portion of the intermediate portion of the tube 4, thereby fixing the ball-circulating tube 4 to the ball nut 2.

It should be noted that the projections 12 of the circulating-part holding member 7 may be formed by punching or the like after the circulating-part holding member 7 is fitted to the ball nut 2, so as to facilitate the fitting of the circulating-part holding member 7 to the ball nut 2. Further, as for the number of projections 12, although two projections are illustrated in the drawings, it is sufficient if more than one projection is provided.

As described above, in accordance with this first embodiment, the ball-circulating tube 4 can be reliably fixed to the ball nut 2 very simply, and as compared with the conventional method in which the ball-circulating tube 4 is fixed by an adhesive, it is possible to substantially reduce the number of processing steps and shorten the assembly time.

Figure 9:
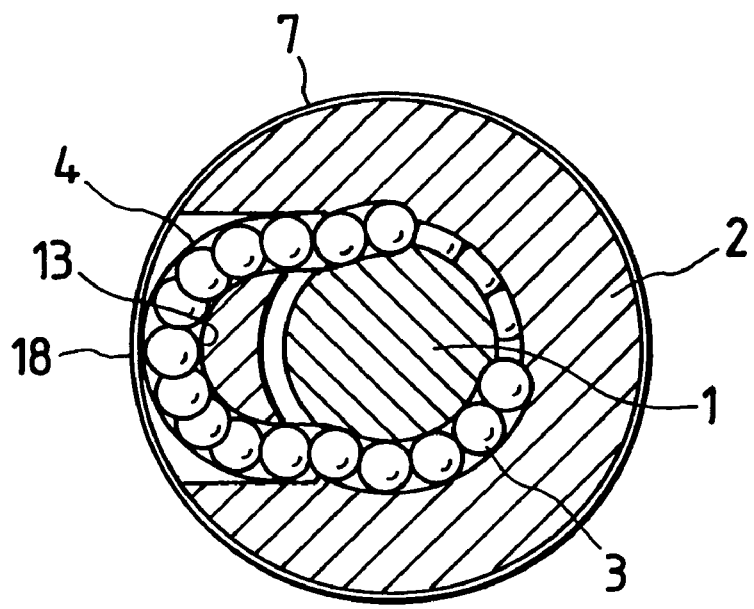
FIG. 9 is a cross-sectional view of a ball screw device of the ball-circulating-part embedded type in accordance with a second embodiment of the present invention.

FIG. 9 shows a second embodiment of the present invention. In this second embodiment, the ball-circulating tube 4 is formed substantially in a U-shape, and its portion which abuts against the circulating-part holding member 7 is set as a central portion 18 of the fitted outward surface portion of the intermediate portion of the ball-circulating tube 4. The other arrangements and operation are identical to those of the first embodiment.

Figure 10:
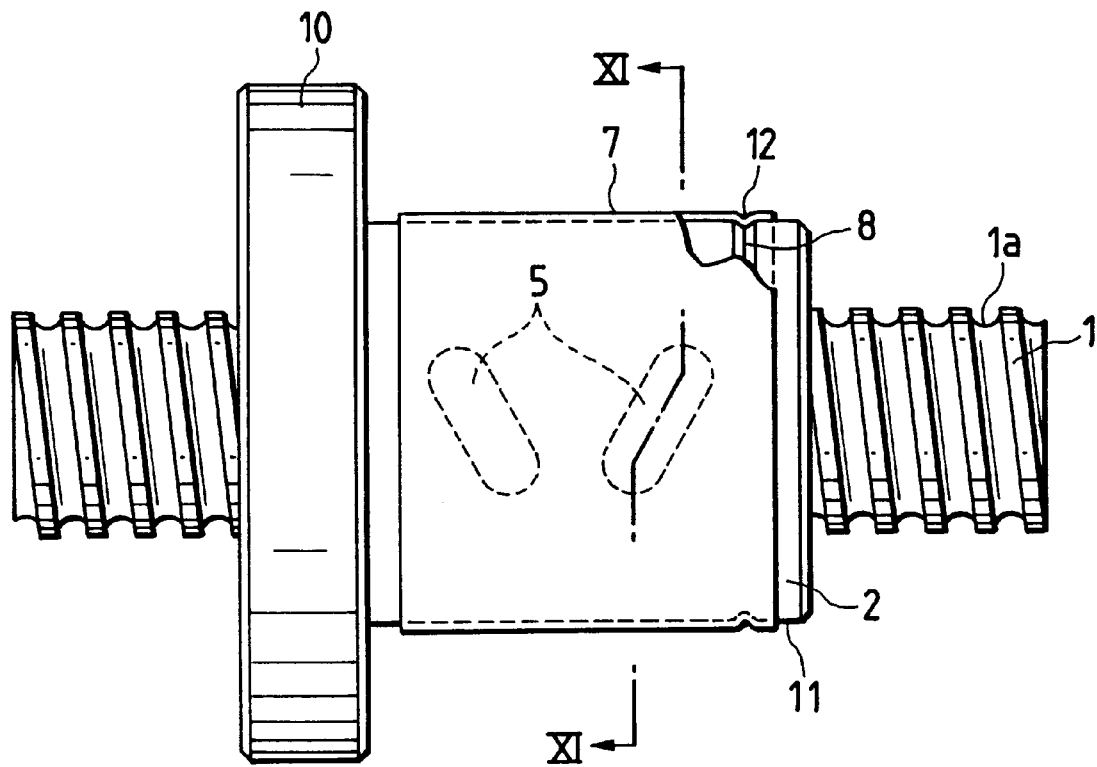
FIG. 10 is a plan view of a ball screw device of the ball-circulating-part embedded type in accordance with a third embodiment of the present invention.
Figure 11:
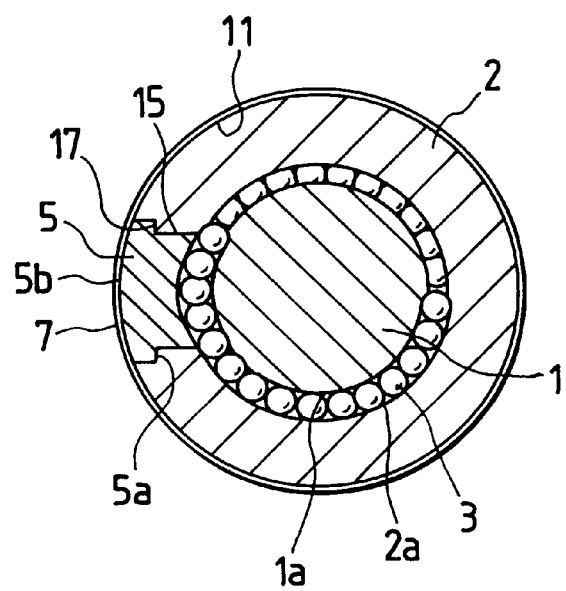
FIG. 11 is a cross-sectional view illustrating a ball-circulating piece section and taken along line XI—XI of FIG. 10.

FIGS. 10 and 11 show a third embodiment of the present invention. In this third embodiment, an elliptic hole 15, in which a ball-circulating piece 5 for guiding the multiplicity of balls 3 and making them circulatable is fitted, is formed in the ball nut 2 in such a manner as to extend from the outer peripheral surface 11 to the inner peripheral surface of the ball nut 2 and cut away a part of the ball screw groove 2a. A flat seat surface 17 for positioning is provided at a peripheral edge of the hole 15. Meanwhile, a surface 5a for abutting against the seat surface 17 projects from around the ball-circulating piece 5. A fitted outward end surface 5b of the ball-circulating piece 5 has a curved surface which is flush with the outer peripheral surface 11 of the ball nut 2 when the ball-circulating piece 5 is fitted in the hole 15 of the ball nut 2.

The other arrangements and operation are identical to those of the first embodiment.

Figure 12:
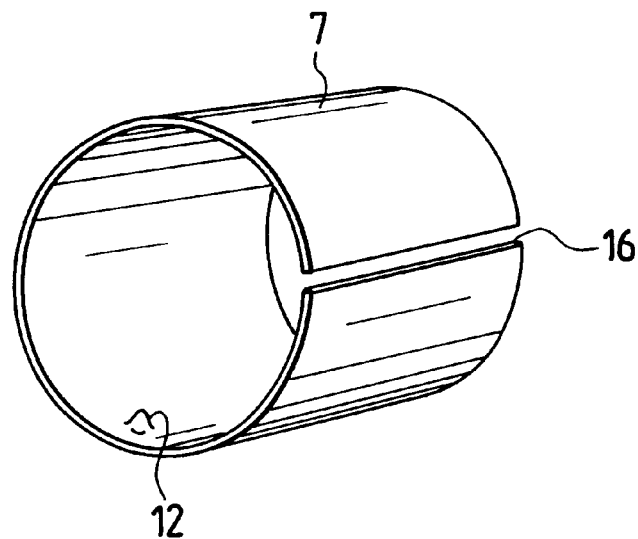
FIG. 12 is a perspective view of the circulating-part holding member in accordance with a fourth embodiment of the present invention.

FIG. 12 shows the circulating-part holding member 7 in accordance with a fourth embodiment of the present invention.

In contrast to the hollow cylindrical shape of the circulating-part holding member 7 in the first to third embodiments, the shape of the circulating-part holding member 7 in this fourth embodiment is provided with a substantially C-shaped cross section by forming a slit 16 in the hollow cylindrical shape. Due to the provision of the slit 16, the circulating-part holding member 7 can be easily fabricated by press forming a metal plate. In addition, although, in the first to third embodiments, the circulating-part holding member 7 is formed of a metal plate to prevent damage due to a high stress occurring when the circulating-part holding member 7 is fitted to the ball nut 2 or when the projections 12 are formed after fitting, the provision of the slit 16 as in this fourth embodiment decreases the stress occurring in the circulating-part holding member 7 during fitting. Thus it becomes possible to use the circulating-part holding member 7 which is formed of a plastic.

The other arrangements and operation are identical to those of the first to third embodiments.

Figure 13:
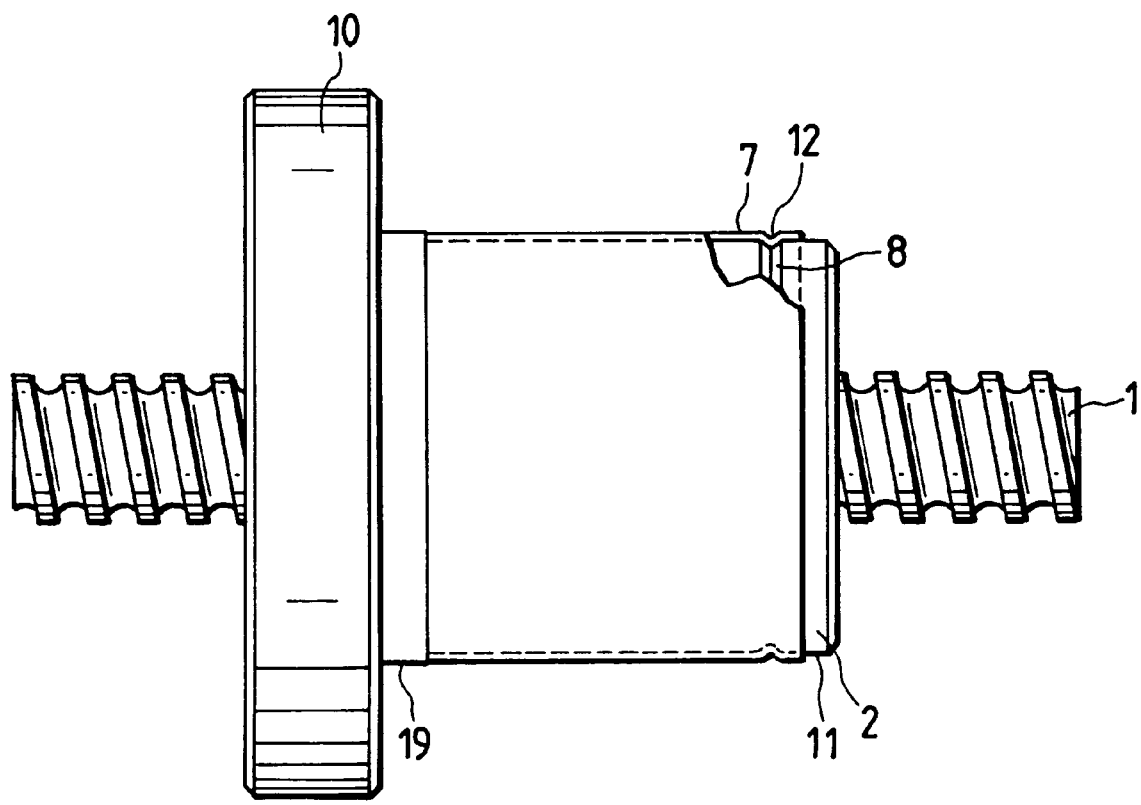
FIG. 13 is a plan view of a ball screw device of the ball-circulating-part embedded type in accordance with a fifth embodiment of the present invention.

FIG. 13 shows a fifth embodiment of the present invention. In this fifth embodiment, an attachment reference portion 19 having an outer diameter larger than the outer diameter of the circulating-part holding member 7 is formed around on the outer periphery of the ball nut. The attachment reference portion 19 has a circular cross section. The other arrangements and operation are identical to those of the first to fourth embodiments.

Figure 14:
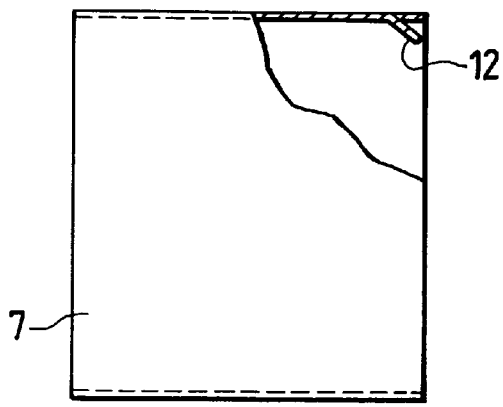
FIG. 14 is a front elevational view of the circulating-part holding member in accordance with a sixth embodiment of the present invention.
Figure 15:
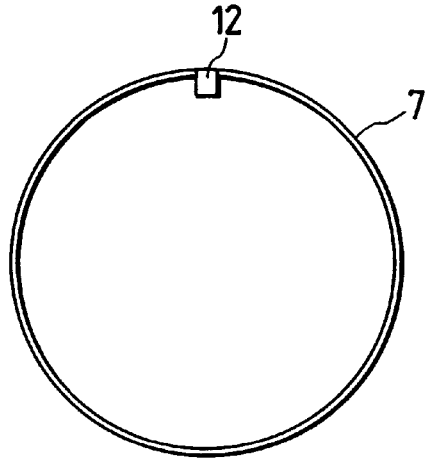
FIG. 15 is a side elevational view of the circulating-part holding member shown in FIG. 14.
Figure 16:
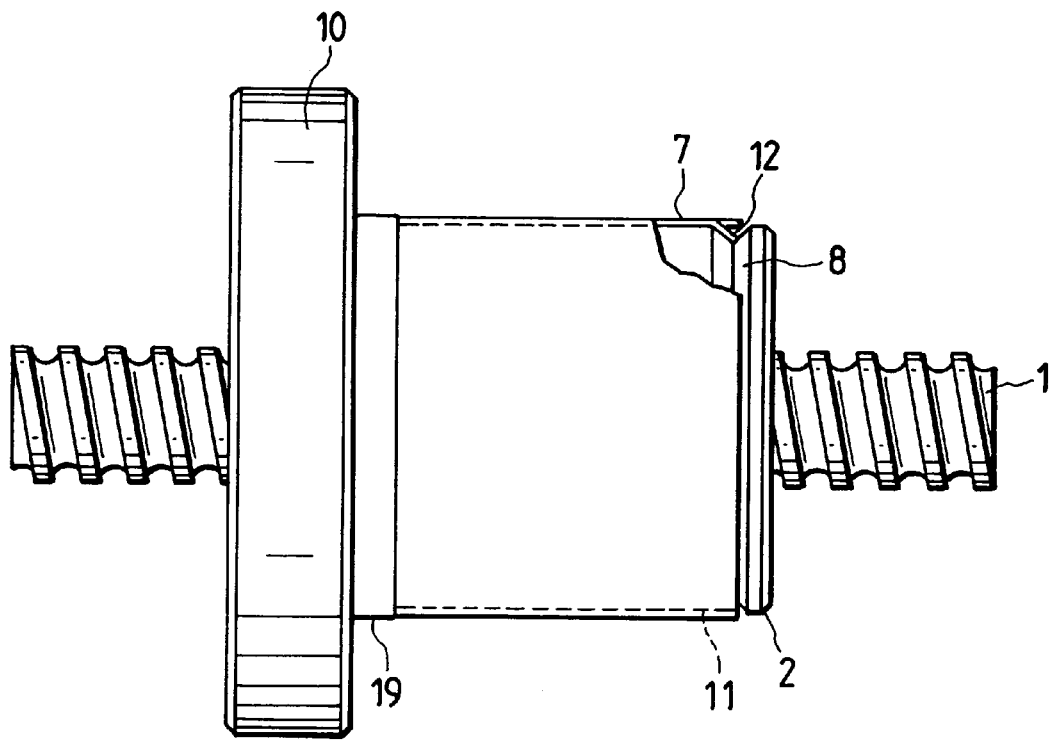
FIG. 16 is a plan view of a ball screw device of the ball-circulating-part embedded type in accordance with the sixth embodiment.

FIGS. 14 to 16 show a sixth embodiment of the present invention. FIG. 14 is a front elevational view of the circulating-part holding member; FIG. 15 is a side elevational view of the circulating-part holding member; and FIG. 16 is a plan view of the ball screw device of the ball-circulating-part embedded type.

In this sixth embodiment, the projection 12 is formed by cutting an end portion of the circulating-part holding member 7. The other arrangements and operation are identical to those of the first to fifth embodiments.

It should be noted that, as the shape of the groove 8 with the V-shaped cross section formed in the ball nut 2 in the first to sixth embodiments, a groove having a U-shaped cross section or a conical or cylindrical hole due to drilling may be used.

Further, although the ball nut 2 is provided with the flange 10 in the first to sixth embodiments, the structure for fixing the ball-circulating part in accordance with the present invention may be applied irrespective of the presence or absence of the flange.

Furthermore, a projection with a U- or V-shaped cross section, which is formed continuously in the circumferential direction in such a manner as to project radially inwardly, may be provided in the vicinity of an end portion of the circulating-part holding member 7 provided with the slit 16, and this projection may be fitted to the ball nut 2 having the groove 8 around its outer peripheral portion in the first to third and fifth embodiments.

Figure 17:
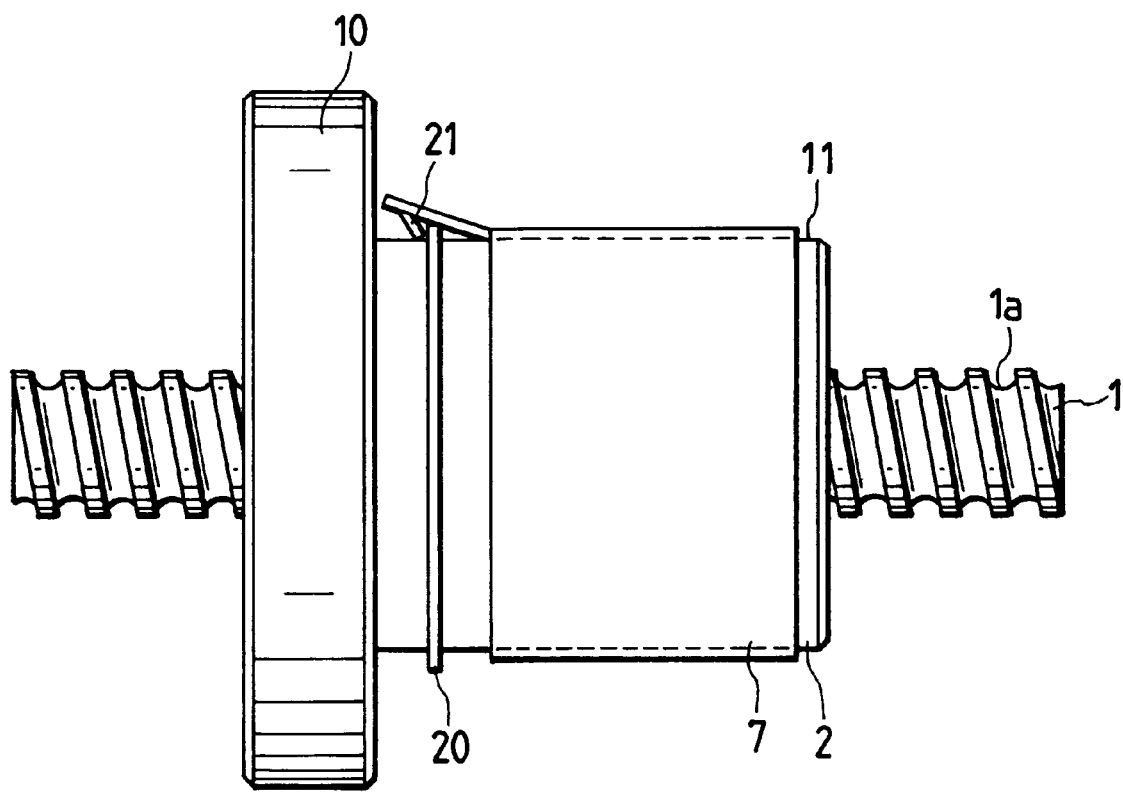
FIG. 17 is a plan view of a ball screw device of the ball-circulating-part embedded type in accordance with a seventh embodiment of the present invention.
Figure 18:
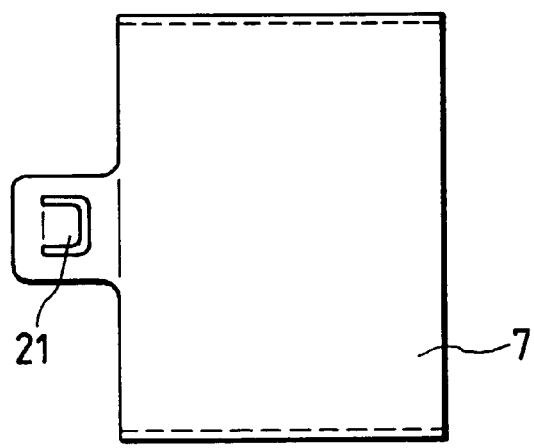
FIG. 18 is a front elevational view of the circulating-part holding member in accordance with the seventh embodiment.
Figure 19:
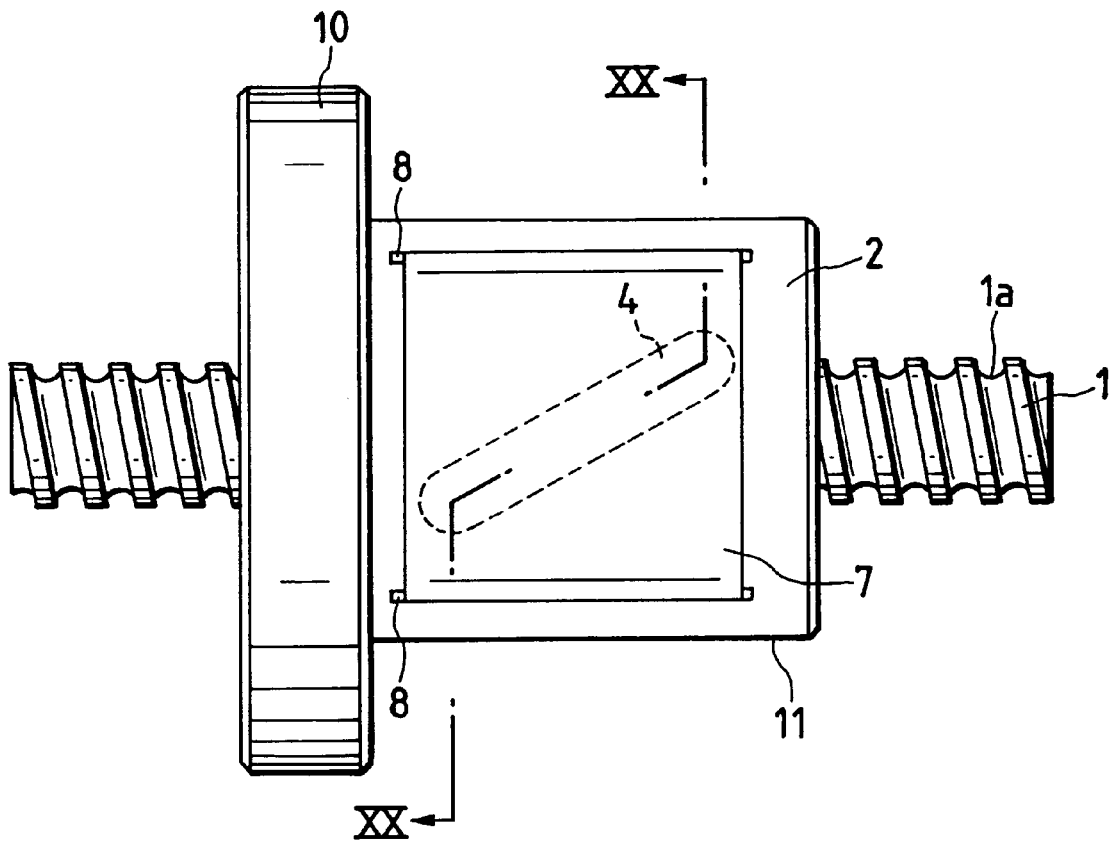
FIG. 19 is a plan view of a ball screw device of the ball-circulating-part embedded type in accordance with an eighth embodiment of the present invention.

FIGS. 17 and 18 show a seventh embodiment of the present invention. FIG. 19 is a plan view of the ball screw device of the ball-circulating-part embedded type, and FIG. 18 is a front elevational view of the circulating-part holding member. Component parts which are identical to those of the first embodiment will be denoted by the same reference numerals, and a description thereof will be omitted.

A protrusion 20 is formed around the outer peripheral surface 11 of the ball nut 2. Meanwhile, a projecting portion is formed projectingly from another end portion of the circulating-part holding member 7, and a projection 21 which is cut out toward the protrusion 20 is formed in a portion of the projecting portion. The circulating-part holding member 7 can be prevented from coming off the ball nut 2 by causing the protrusion 20 to engage the projection 21.

Figure 20:
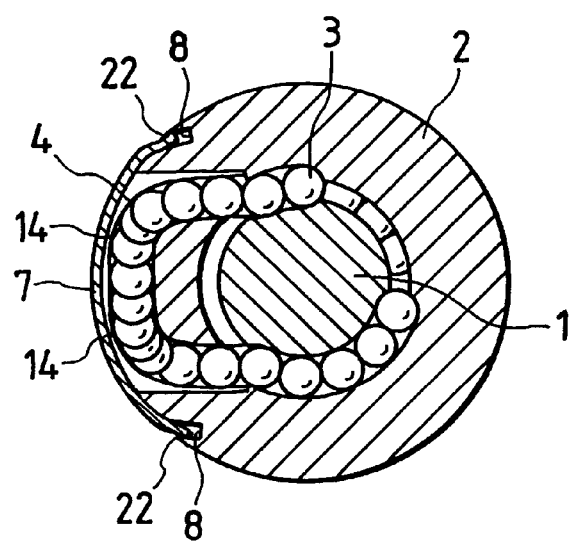
FIG. 20 is a cross-sectional view, taken along line XX—XX of FIG. 19, of the ball-circulating tube section.

FIGS. 19 and 20 show an eighth embodiment of the present invention. FIG. 19 is a plan view of the ball screw device of the ball-circulating-part embedded type, and FIG. 20 is a cross-sectional view taken along line XX—XX of FIG. 19. Component parts which are identical to those of the first embodiment will be denoted by the same reference numerals, and a description thereof will be omitted.

Two grooves 8 are formed in the outer peripheral surface of the ball nut 2 in such a manner as to extend in the axial direction of the ball nut 2 in parallel with each other. Meanwhile, the circulating-part holding member 7 is formed of a metal plate which is a resilient member. Opposite ends 22 of the circulating-part holding member 7 are engaged in the grooves 8 in a state in which resilient deformation is imparted to the opposite ends 22, thereby fixing the circulating-part holding member 7 to the ball nut 2.

Figure 21:
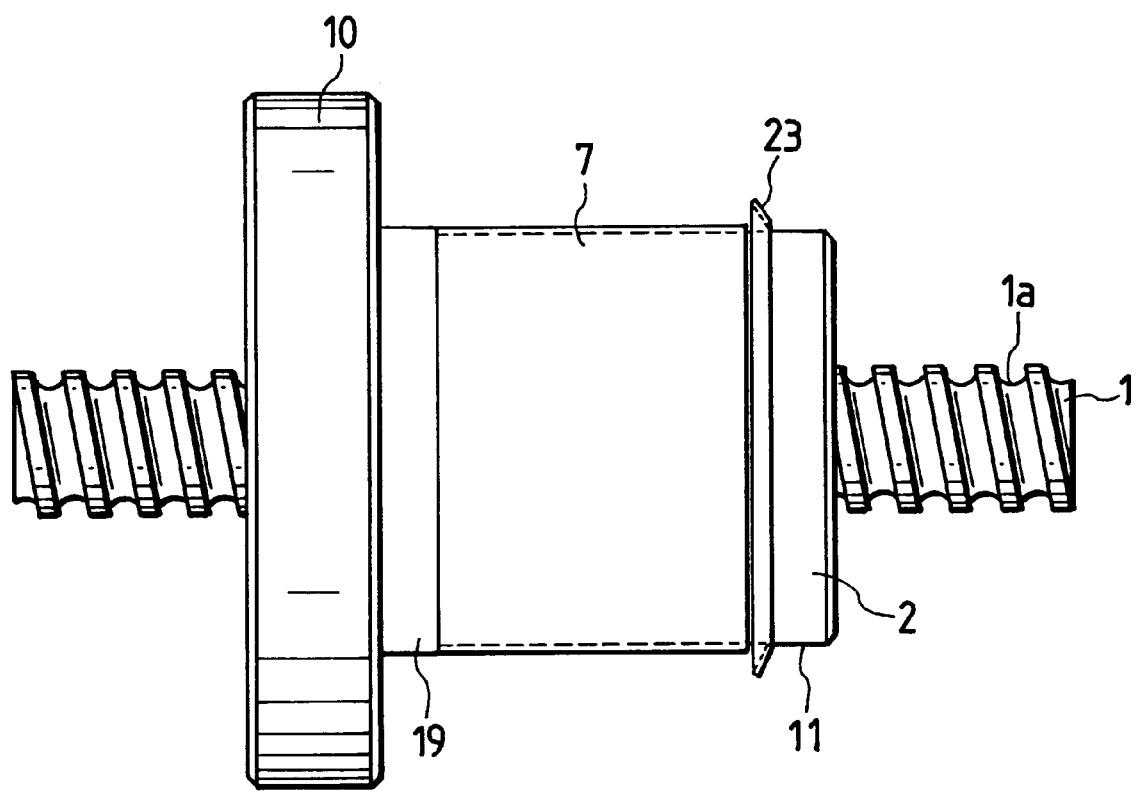
FIG. 21 is a plan view of a ball screw device of the ball-circulating-part embedded type in accordance with a ninth embodiment of the present invention.

FIG. 21 shows a ball screw device of the ball-circulating-part embedded type in accordance with a ninth embodiment of the present invention. Component parts which are identical to those of the fifth embodiment will be denoted by the same reference numerals, and a description thereof will be omitted.

In this ninth embodiment, a washer 23 serving as a restricting member is press fitted to the outer peripheral surface 11 of the ball nut 2. The washer 23 makes it possible to prevent the circulating-part holding member 7 fitted to the outer surface 11 from coming off.

In accordance with the present invention, an advantage can be obtained in that it is possible to provide a high-productivity ball screw device in which the ball-circulating part can be simply fixed reliably to the ball nut by means of the circulating-part holding member fabricated by press forming or plastic molding, which is capable of eliminating the process of cleaning and degreasing the ball nut and the ball-circulating part due to the use of an adhesive in the conventional example and does not require the time until the hardening of the adhesive, and which involves less time and trouble in the assembly with a simple structure.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A ball-circulating-part embedded ball screw device, comprising:

a screw shaft having a helical thread groove on an outer peripheral surface thereof;

a ball nut having an engaging portion on an outer peripheral surface thereof and a thread groove provided on an inner peripheral surface thereof in correspondence with the helical thread groove of said screw shaft, said screw shaft being loosely fitted in the inner peripheral surface of said ball nut;

a multiplicity of balls rotatably fitted between the two thread grooves;

a ball-circulating member fitted in said ball nut for defining an endless rolling passage in which said balls are circulated while said balls are being guided by said ball-circulating member, at least a portion of a fitted outward surface of said ball-circulating member being substantially flush with the outer peripheral surface of said ball nut in a vicinity of the fitted outward surface of said ball-circulating member; and a holding member for fixing said ball-circulating member to said ball nut by being fitted over the outer peripheral surface of said ball nut and covering the fitted outward surface of said ball-circulating member, said holding member having an engaged portion which is engaged with said engaging portion of said ball nut so as to prevent the holding member from being moved relative to said ball nut in the axial direction thereof, wherein said engaging portion of said ball nut comprises a retaining recess formed on the outer peripheral surface thereof; and said engaged portion of said holding member comprises a projection member formed on the inner peripheral surface thereof and engaged with said retaining recess.

2. The ball screw device according to claim 1, in which said ball nut has a retaining hole, and said ball-circulating member is a ball circulating piece fitting into said retaining hole.

3. The ball screw device according to claim 1, in which said retaining recess is extended over the whole of the outer peripheral surface thereof; and said projection member comprises a plurality of projections disposed at a predetermined interval in the circumferential direction of said holding member.

4. The ball screw device according to claim 1, in which said ball nut has two tube-fitting holes, and said ball-circulating member is a tube, the end portions of said tube respectively inserted into said two tube-fitting holes.

5. The ball screw device according to claim 1, wherein said engaging portion of said ball nut is an annular member and said engaged portion of said holding member is formed directly from a portion of said holding member, said engaging portion and said engaged portion engaging directly with each other so as to prevent said holding member from axially moving with respect to said ball nut.

6. The ball screw device according to claim 5, wherein said annular member is an annular groove.

7. A ball-circulating-part embedded ball screw device, comprising:

a screw shaft having a helical thread groove on an outer peripheral surface thereof;

a ball nut having an engaging portion on an outer peripheral surface thereof and a thread groove provided on an inner peripheral surface thereof in correspondence with the helical thread groove of said screw shaft, said screw shaft being loosely fitted in the inner peripheral surface of said ball nut;

a multiplicity of balls rotatably fitted between the two thread grooves;

a ball-circulating member fitted in said ball nut for defining an endless rolling passage in which said balls are circulated while said balls are being guided by said ball-circulating part, at least a portion of a fitted outward surface of said ball-circulating member being substantially flush with the outer peripheral surface of said ball nut in a vicinity of the fitted outward surface of said ball-circulating member; and a holding member for fixing said ball-circulating member to said ball nut by being fitted over the outer peripheral surface of said ball nut and covering the fitted outward surface of said ball-circulating member, said holding member having an engaged portion which is engaged with said engaging portion of said ball nut as to prevent the holding member from being moved relative to said ball nut in the axial direction thereof, wherein said engaging portion of said ball nut comprises a retaining recess formed on the outer peripheral surface thereof, said engaged portion of said holding member comprises a projection member formed on the inner peripheral surface thereof and engaged with said retaining recess, said retaining recess is extended over the whole of the outer peripheral surface thereof, and said projection member comprises at least one projection.

8. The ball screw device according to claim 7, wherein said projection member comprises a plurality of projections disposed at a predetermined interval in the circumferential direction of said holding member.

9. The ball screw device according to claim 7, in which said ball nut has two tube-fitting holes, said ball-circulating member is a tube, and the end portions of said tube are respectively inserted into said two tube-fitting holes.

10. The ball screw device according to claim 7, in which said ball nut has a retaining hole, and said ball-circulating member is a ball circulating piece fitting into said retaining hole.

* * * * *